United States Patent

Mingeishi et al.

[11] Patent Number: 6,059,918
[45] Date of Patent: May 9, 2000

[54] SEAT AND MANUFACTURING METHOD THEREOF

[75] Inventors: Takeshi Mingeishi; Masayuki Kubo; Atsushi Onozuka, all of Kanagawa-ken, Japan

[73] Assignee: NHK Spring Co., Ltd., Kanagawa-Ken, Japan

[21] Appl. No.: 08/590,184

[22] Filed: Jan. 23, 1996

Related U.S. Application Data

[63] Continuation-in-part of application No. 08/239,601, May 9, 1994, abandoned.

[51] Int. Cl.[7] .................................................... B32B 31/00
[52] U.S. Cl. ................................................................ 156/293
[58] Field of Search ......................... 297/452.61, 452.58, 297/DIG. 1, 452.62, 463.2; 5/402; 156/93, 216, 293, 306.6; 29/91.1

[56] References Cited

U.S. PATENT DOCUMENTS

| | | |
|---|---|---|
| 3,075,862 | 1/1963 | Hoyer ............................ 297/452.61 X |
| 3,273,178 | 9/1966 | Baruth et al. .................. 297/452.61 X |
| 3,400,040 | 9/1968 | Osgood . |
| 3,513,050 | 5/1970 | Samuels et al. . |
| 3,520,755 | 7/1970 | Scholl et al. . |
| 3,566,423 | 3/1971 | Reinfeldt ........................... 297/452.58 X |
| 3,649,974 | 3/1972 | Baruth et al. ............................... 5/402 |
| 4,465,534 | 8/1984 | Zelkowitz ........................ 297/218.1 X |
| 4,526,420 | 7/1985 | Kawamura et al. ................. 297/218.1 |
| 4,534,595 | 8/1985 | Abe et al. ....................... 297/DIG. 1 X |
| 4,765,045 | 8/1988 | Selbert et al. ................. 297/452.61 X |
| 4,930,173 | 6/1990 | Woller . |
| 5,158,634 | 10/1992 | Kasuya ........................... 297/DIG. 1 X |
| 5,560,677 | 10/1996 | Cykana et al. ...................... 297/218.3 |

FOREIGN PATENT DOCUMENTS

| | | | |
|---|---|---|---|
| 4348715 | 12/1992 | Japan ................................ 297/452.61 |
| 2192536 | 1/1988 | United Kingdom ............. 297/452.61 |

*Primary Examiner*—Milton Nelson, Jr.
*Attorney, Agent, or Firm*—Lackenbach Siegel

[57] ABSTRACT

A method of manufacturing a seat having a seat pad of predetermined configuration, comprising the steps of installing a separate hanging bag, provided with a hot-melt adhesive on an external surface thereof, on a suitable portion of a rear surface of an outer skin of the seat; inserting a wire-like material in the hanging bag, and drawing and setting the hanging bag into an adhering portion of a groove shaped in the seat pad, and removing the wire-like material after the hot-melt adhesive is heated and melted and adhered to the seat pad.

10 Claims, 7 Drawing Sheets

FIG. 14 in the present invention, a synthetic resin plate of plastic adhesive

SEAT AND MANUFACTURING METHOD THEREOF

This application is a continuation-in-part of our earlier filed U.S. patent application, Ser. No. 08/239,601, filed May 9, 1994, now abandoned.

BACKGROUND OF THE INVENTION

The present invention relates to a seat and manufacturing method thereof wherein a cover sheet can be adhered simply over a pad, and comfort, the feel of the seat and shape design can all be remarkably improved.

As a widely prevailing art, first, a hung bag, through which wires are disposed, is stitched to the back of a cover sheet, said wires being dipped with urethane pad material and subsequently foamed integrally with the material to attach the cover sheet over the pad, the wires then being fixed by hog rings.

In Japanese Patent Publication No. H4-64300, a urethane pad is adhered to a cover sheet applied with a hot melt-type adhesive overall.

In Japanese Patent Publication No. H4-253892, a hot melt type adhesive is applied between a cover sheet and a urethane pad. The adhesive is then melted using a metallic material which is heated by induction heating, leading to adherence of the pad to the leather.

However, in any of the conventional arts, as mentioned above, there are quite a few disadvantages, as follows:

a) Uniformity in the finished products cannot easily be attained because a number of manual steps are required, and skill is not always equal.

b) Workers become tired, requiring short-term work shifts.

c) The hanging line becomes inevitably straight-lined because metallic wires are used, which will limit flexibility in design.

d) During recycling, urethane should be separated from metallic materials, such as wires and hog rings, resulting in expensive and time-consuming work.

e) Metallic materials within the urethane pad may make users feel uncomfortable, sensing materials foreign from each other.

In Japanese Patent Publication No. H4-64300, in particular, adhesion is applied over the entire seat, which results in a seat that feels hard.

Further, specifically in Japanese Patent Publication No. H4-253892, induction heating requires metallic materials and metallic powder to be used within the hot melt adhesive, leading to the various defects that follow:

Low workability due to extremely careful attention to maintain the contact between the metallic material and the adhesive, since the latter will not melt if it separates from the former.

Moreover, seats manufactured by using adhesives admixed with metallic powder cannot be recycled.

Additionally, the manufacturing costs become very expensive, both in facilities comprising a high frequency furnace, etc., and in materials such as metallic powder-mixed adhesive.

The purpose of the present invention is to overcome the number of problems intrinsic to other conventional arts, as described above, and provide a seat as characterized by tough and tenacious adhesion between a cover sheet and a pad attained by a simple, easy, and even automatic manufacturing method, with high uniformity in the products accompanied by an improvement in fitness and comfort for users and variable and attractive designs. This is particularly suitable for recycling.

BRIEF DESCRIPTION OF THE INVENTION

For accomplishing the purposes mentioned above, in the present invention, a synthetic resin plate of plastic adhesive is stitched onto a stitch line of a cover sheet, and then the back of the cover sheet is adhered to a pad with the plastic adhesive. A thin cloth or plastic sheet is placed between the resin plate and the stitch line of the cover sheet like a sandwich when these are stitched.

The stitched portion of the resin plate and the cover sheet thus prepared is placed at the predetermined place of the pad, then the resin plate is heat melted, following by cold stiffening of the adhesive, leading to tight adherence of the pad to the back of the cover sheet.

Owing to the simple mechanism in pad to cover adhesion, no special skills are required in the present invention, generating the number of excellent advantages mentioned above.

Further, in the present invention, the tensile strength of the resin plate can be improved by jointly adhering a thin cloth or thin plastic sheet.

Furthermore, in the present invention, since an expensive heating device such as a high frequency induction heater is not required, remarkable manufacturing cost reductions can be achieved.

Furthermore, another object of the present invention is to obtain an attractive seat in which the cover sheet is tightly adhered onto the pad, there are no unnecessary concave portions and good napped cover sheet has no crushed nap.

In order to obtain the above object, the seat manufacturing method according to the present invention is characterized in that a hanging bag having a hot melt adhesive layer around the outer surface thereof is attached to the predetermined position of a back surface of the seat cover plate, then the hot melt adhesive layer is adhered against the seat pad by heating and melting the hot melt adhesive layer.

In order to attain the above object, the seat manufacturing method according to the present invention is also characterized in that a hanging bag having a hot melt adhesive layer around the outer surface thereof is attached to the predetermined position of the back surface of the seat cover plate, and a wire-like material such as metallic or plastic pipe is inserted in the hanging bag, then the hanging bag is drawn into the adhesive portion of the seat pad, the hot melt adhesive layer is adhered to the seat pad by heating and welding the layer, and at last the pipe is taken out.

As above-mentioned heating method, hot air is sent through a plurality of holes shaped on the peripheral surface of the pipe to melt the hot melt adhesive, and then a cool air is sent through the pipe to harden the adhesive, or another electrical heating member can be used to heat the metallic pipe provided with the electric heater.

As the hanging bag provided with the hot melt adhesive on the external surface thereof is attached to the back surface of the cover sheet and adhered to the pad, it is rare that the hot melt adhesive is torn off and that inferior adhesion is produced.

Namely, in this manufacturing method, the hanging bag provided the hot melt adhesive layer around the exterior surface thereof, and the pipe is inserted in the hanging bag, and as the bag is pressed to the pad as a whole, then the deep drawn shape is built with an attractive appearance without partial engraving portion, and as a result the manufacturing becomes simple.

Also, it becomes possible to simultaneously stitch the hanging bag together with the cover sheet by installing the bag along the stitching line of the cover sheet.

In supplying the hot air through the pipe inserted in the hanging bag, as the air reaches the hot melt adhesive through spaced meshes of the bag, and adheres the bag against the seat pad by melting the adhesives, it becomes possible to manufacture a seat in which the cover plate adhered to the seat pad.

Also, by applying the metallic pipe provided with the electric heater, it becomes possible to melt and adhere the hot melt adhesive layer by heating the pipe with the electric heater together with drawing the cover plate into the seat pad.

BRIEF DESCRIPTION OF THE DRAWINGS

The object and features of the present invention will become more readily apparent from the following detailed description taken in conjunction with the accompanying drawings in which.

DETAILED DESCRIPTION OF THE INVENTION

In the first embodiment, as depicted in FIGS. 1, 2, 4 and 5, the cover sheet (2) is cut in accordance to the shape of the pad (1), and then stitched. The back of the cover sheet (2) and the resin plate (3) are stitched simultaneously along with the stitching line, and the said stitched portion is adhered to the pad (1). Such stitching portion of the plate (3) is shown as (4). The cover sheet may be a natural leather sheet, or natural or artificial fabric.

Figure 1:
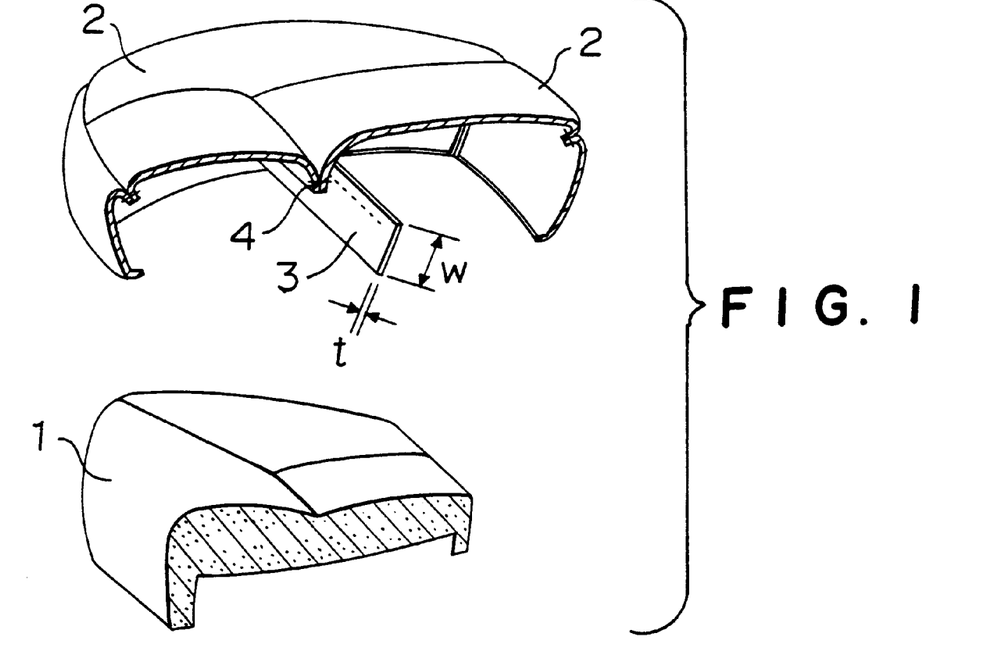
FIG. 1 depicts the first embodiment by a perspective view of the cover sheet stitched with the resin plate and the pad with half the cross section.

In this case, the resin plate (3) is a hot-melt type plastic adhesive made of polyamide-type resin with a melting point of 100–150° C., specifically for vapor heating. In the case of hot air heating, a polyester-type resin adhesive is used. Typically, the width (w) and thickness (t) of the resin plate are 10–50 mm and 0.05–1.00 mm, respectively, as shown in FIG. 1.

Figure 2:
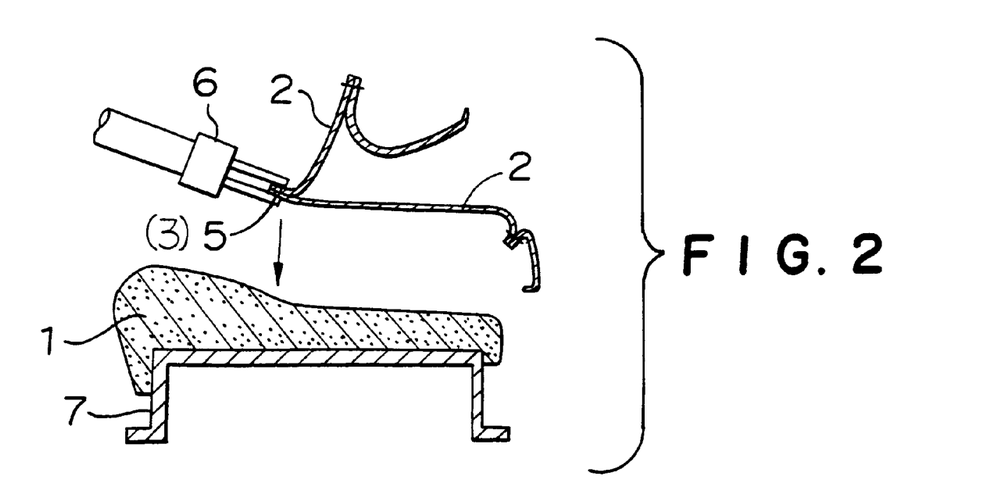
FIG. 2 is a cross section showing the process for placing the stitched resin plate onto a pad.

Then, as shown in FIG. 2, the stitched portion of the resin plate (3) and the cover sheet (2) are grasped towards the pad (1), which is placed onto the lower form (7), to press the adhering portion (5) into the corresponding position of the pad (1).

Figure 4:
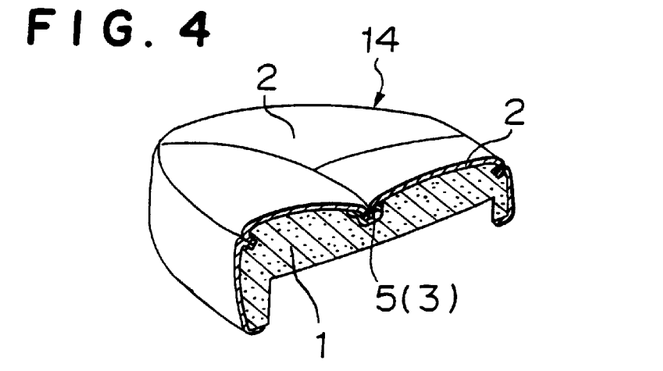
FIG. 4 is a lengthwise sectional view of the first embodiment.
Figure 5:
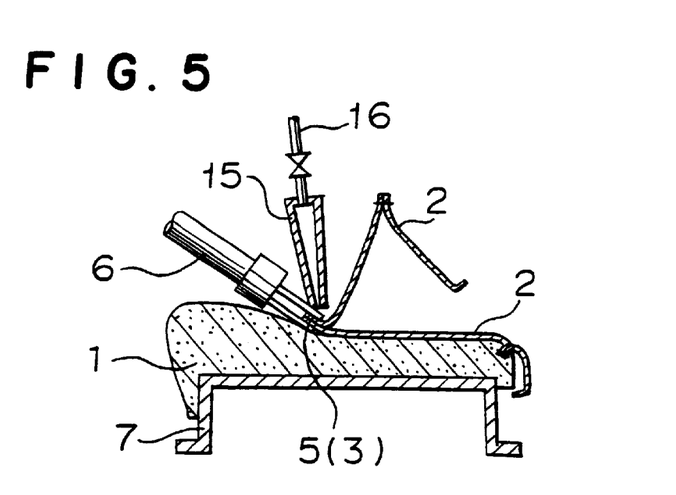
FIG. 5 is a lengthwise sectional view of the first embodiment showing the process wherein the back of the cover sheet is adhered onto the pad after placing the adhering portion at the predetermined place of the pad.

Next, the resin plate (3) is heated by a jet steam upon the adhering portion (5) thereof, a hot steam from the nozzle (15), until the cover sheet (2) adheres to the pad (1) with the adhesive (3), followed by cold stiffening the adhesive, and a seat product (14) is manufactured, as shown in FIG. 4 by turning over the cover sheet (2).

Such a seat product (14) as the first embodiment is provided with excellent and distinguishable characteristics over any other conventional seat, as described above in detail.

Figure 3:
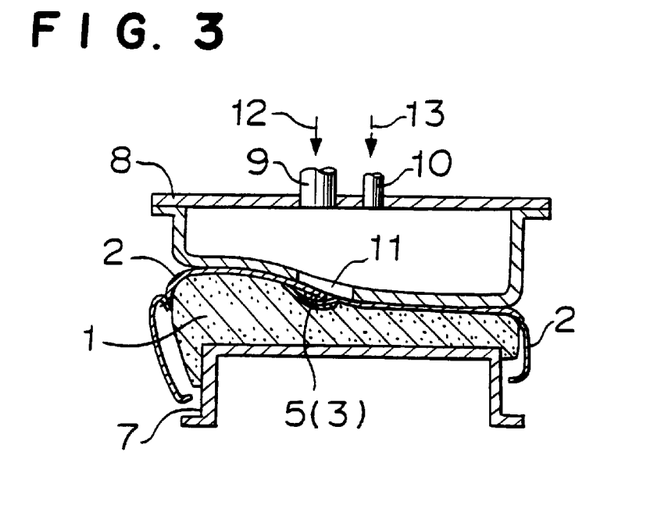
FIG. 3 is a lengthwise sectional view of the second embodiment showing the process of adhering the adhering portion of the cover sheet after placement thereof.

The second embodiment, as shown in FIG. 3, is a method to adhere the cover sheet (2) to the pad (1) at the predetermined position by means of pressing between the upper form (8) and the lower form (7).

The upper form (8) is provided with a heating medium feeder (9), a cooling medium feeder (10) and a through path for both media (11). First, the hanging or pulling down resin plate (3), disposed between the pad (1) and the cover sheet (2), is heated by feeding hot air or steam (12) into the upper form (8) from the heating medium feeder (9), while being pressed.

After melting the resin plate (3), of a hot melt type plastic adhesive by heating, the plate (3) is cold stiffened by exposing it to the cold air (13), fed into the upper form (8) from the cooling medium feeder (10).

Finally, the seat product (14), as shown in FIG. 4, is obtained by removing the upper form (8).

All the mechanisms and functions in the second embodiment, other than the above description, are similar to those in the first embodiment.

The third embodiment is depicted in FIGS. 6–9 as specifically described in section 4 regarding the drawings.

Figure 6:
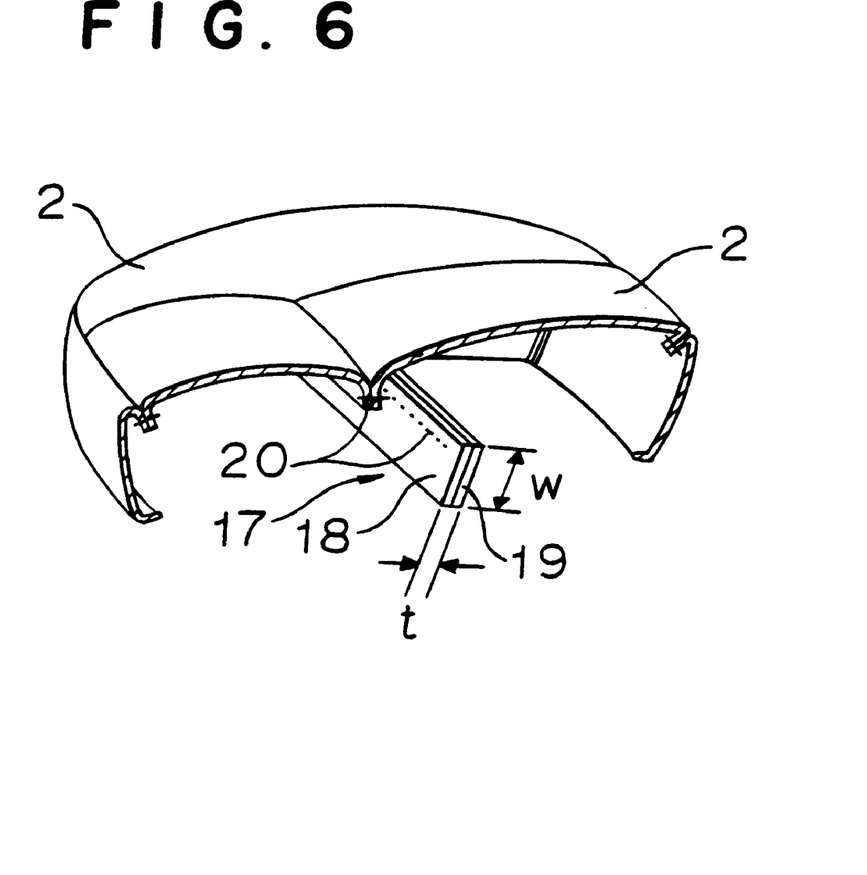
FIG. 6 is a perspective view showing the third embodiment, with half the sectional view of the cover sheet stitched with the resin plate.

In this embodiment, a resin plate (17) is stitched to the back of the cover sheet (2), simultaneously as the portion of the cover sheet (2) is stitched up, along the stitch line thereof, which is to be adhered to the pad (1). In FIG. 6, such stitch portion of the resin plate (17) is depicted as (20).

Figure 7:
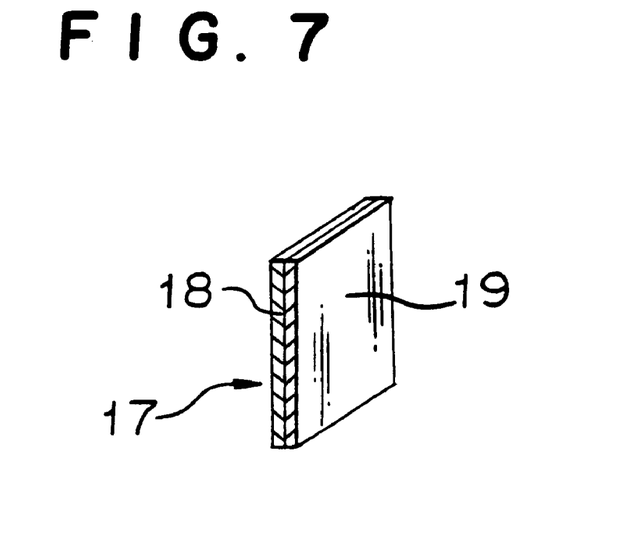
FIG. 7 is an enlarged perspective view of one portion of the resin plate used in the third embodiment.

As shown in FIG. 7, the plate (17) is laminated, consisting of a thin cotton cloth or plastic sheet layer (18) and hot melt adhesive layers (19). The cotton cloth may be a usual textile, unwoven cloth or tricot. The plastic sheet may be made of polypropyrene. Further, the hot melt adhesives (19) are polyamide of polyester types, similar to the first embodiment. The cotton of the plastic sheet layer (18) and adhesive layer (19) are both 0.05–0.5 mm in thickness. The thickness and width of the resin plate (17) are 0.1–1.0 mm and 10–50 mm, respectively.

Figure 8:
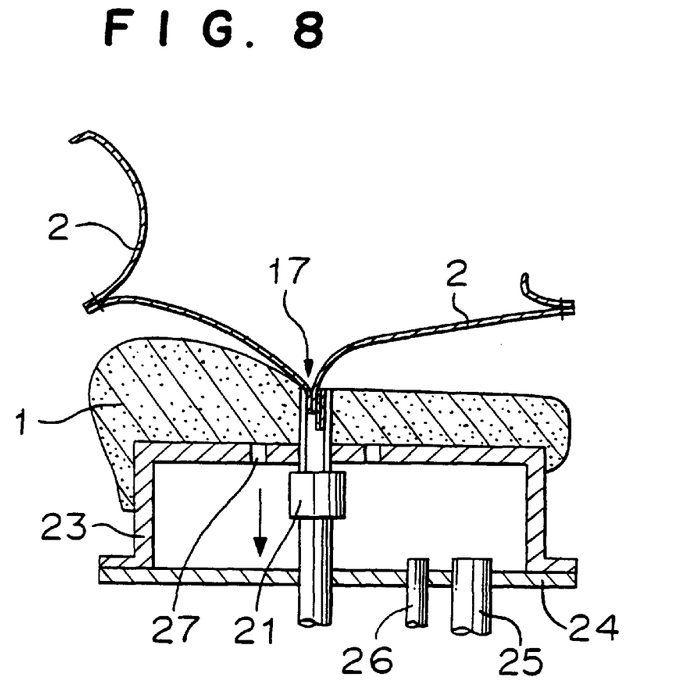
FIG. 8 is a lengthwise sectional view showing the process of pulling down the resin plate into the pad in the third embodiment.

As shown in FIG. 8, the resin plate (17) stitched to the cover sheet (2) is drawn toward the pad (1) using a grasp device (21) at the same time when the cover sheet (2) is covered over the pad (1) placed on the lower form (23).

The form (23) is provided with the heat medium feeder (25), the cooling medium feeder (26) and the through path (27) for both media.

Figure 9:
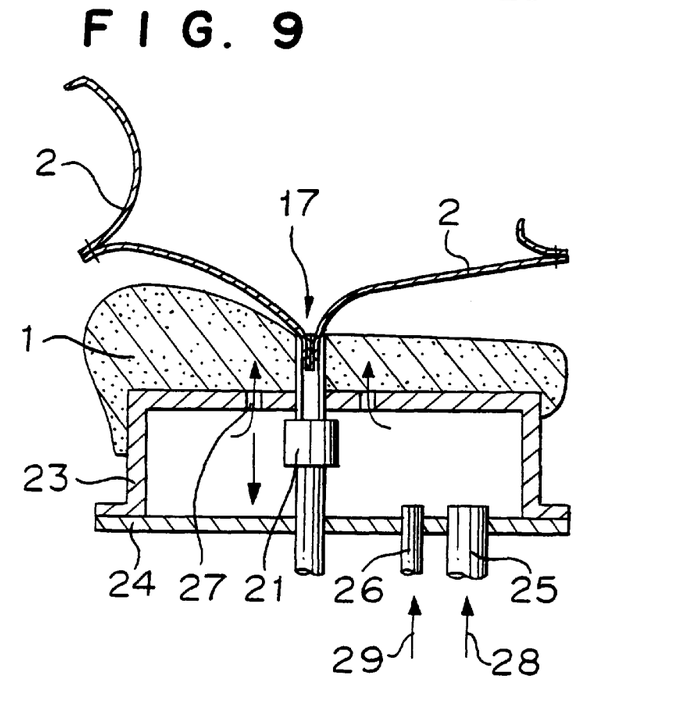
FIG. 9 is a lengthwise sectional view depicting the heat melting process of the resin plate in the third embodiment.

As shown in FIG. 9, hot air or steam (29) is first fed from the feeder (25) into the form (23) to melt the adhesive layer (19) of the resin plate (17).

Cold air (29) is then fed into the form (23) from the feeder (26) to cold stiffen the adhesive (19).

Finally, leaving the grasp device (21), the seat product is removed.

In this case, the resin plate may only comprise hot melt adhesive.

Regarding other structures and functions, the third embodiment is the same as the first embodiment.

Figure 10:
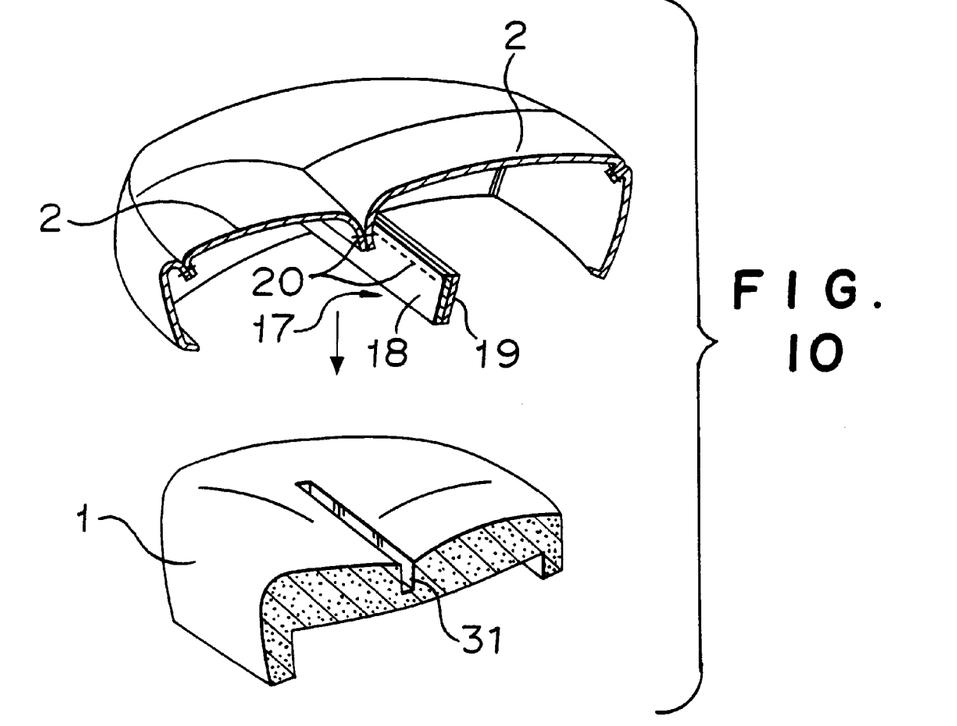
FIG. 10 is a perspective view of the fourth embodiment depicting the cover sheet stitched with the resin plate relative with the shape of the pad, with half the sectional view in the fourth embodiment.
Figure 11:
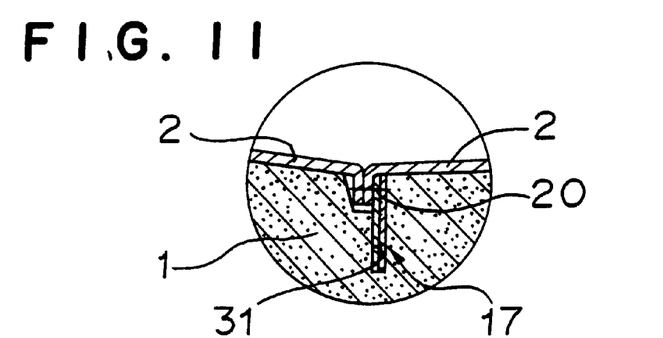
FIG. 11 is a partially enlarged sectional view of the seat product in the fourth embodiment.

The fourth embodiment is depicted in FIGS. 10 and 11, as described in the preceding section regarding the drawings.

In this embodiment, the groove (31) for receiving the resin plate is provided at the predetermined position of the pad (1).

On the other hand, the resin plate (17) is stitched, as in the first embodiment, to the back of the cover sheet (2).

After positioning at the groove (31), the plate (17) is inserted into the groove (31) followed by hot melting the adhesive layer (19) to attain adhesion.

As a result, the resin plate (17) can be pulled down toward the pad (1) more easily, resulting in simple and easy adherence of the cover sheet (2) to the pad (1).

With respect to other features, the fourth embodiment is the same as the first embodiment.

In each embodiment, hot air may be used in place of hot vapor as the heating medium.

Owing to the novel, distinguishable and incomparable characteristics of the present invention, the remarkable advantages and effects are accomplished as follows:

1) Since the procedures are simple, the cover sheet can easily be attached to the pad without special skill, resulting in excellent uniformity of the seat products.

2) Since all the procedures are simple, each process can be automated.

3) Since adhesion is applied to the stitch portion only, higher convertibility can be attained than in any of the conventional seats wherein the cover sheet is adhered to the pad overall.

4) Since the hot melt resin plate is stitched to the cover sheet, high tensile strength is obtained.

5) Such stitching prevents the mis-mating between the adhesive and the cover sheet.

6) Since metallic materials are not used at all, higher convertibility and seating feeling can be obtained without a sensation of foreign materials, than in the conventional seats using various metallic materials.

7) Variable and attractive designs can be attained because the pattern of the cover sheet can be freely chosen.

8) Because there are no metallic materials, the seat products can be recycled.

Further, in the invention according to claim 2, the resin plate comprises the lamination with thin substrate layers and hot melt adhesive layers, resulting in higher tensile strength of the resin plate.

Moreover, in the invention according to claim 3, the resin plate is set at the adhering portion of the pad, then the plate is hot melted, followed by cold stiffening of the adhering portion without using expensive special heaters, such as an induction high frequency wave generator, and expensive metallic powder-incorporated hot melt adhesive. Additionally, all the steps are simple and can thus be automated, leading to remarkable cost reductions.

Figure 12:
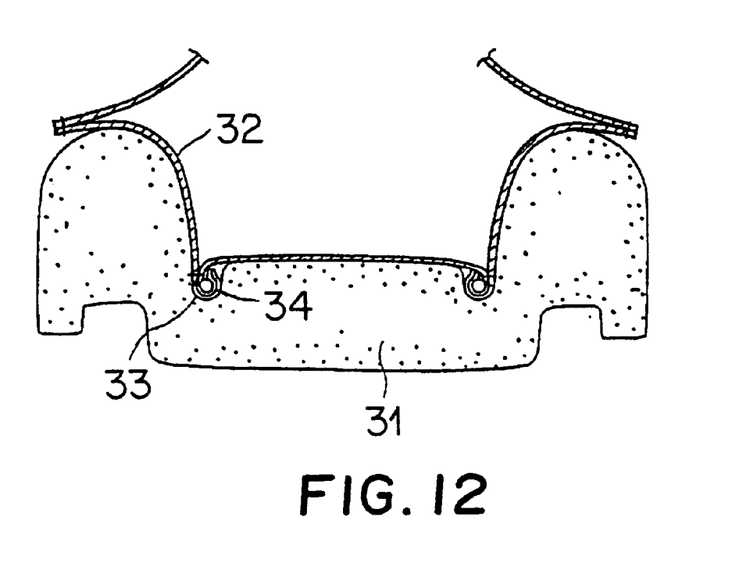
FIG. 12 shows a vertical sectional view of a seat of the fifth embodiment according to the present invention.
Figure 13:
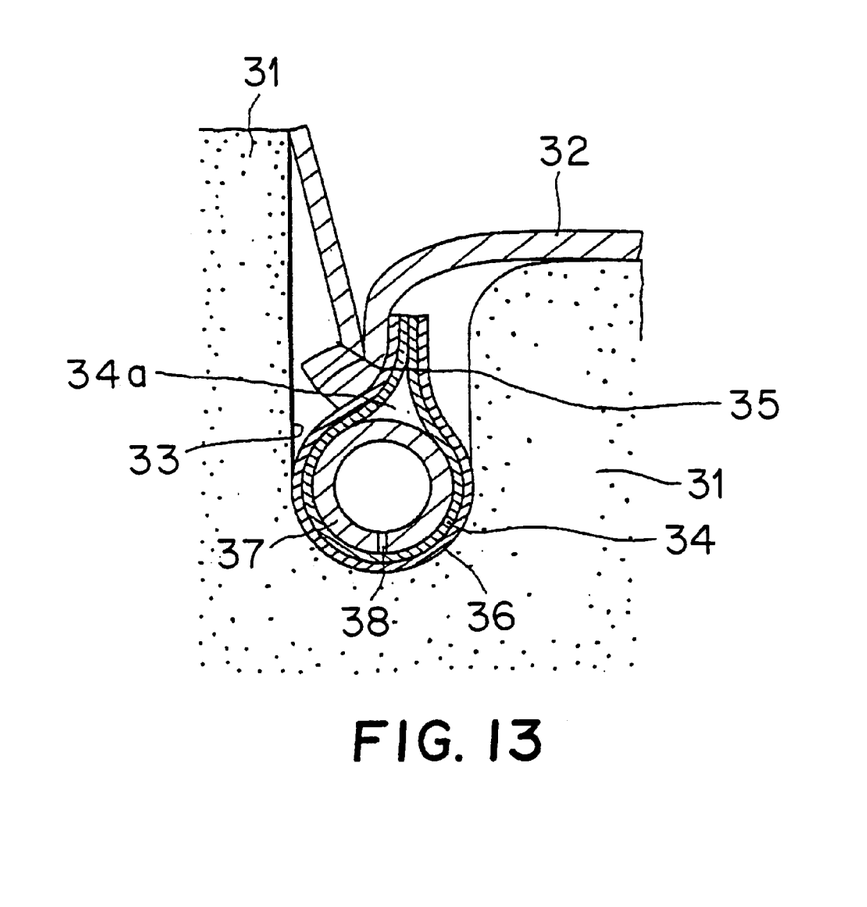
FIG. 13 shows an elongated sectional view of essential parts the seat shown in FIG. 12 under adhering process.
Figure 14:
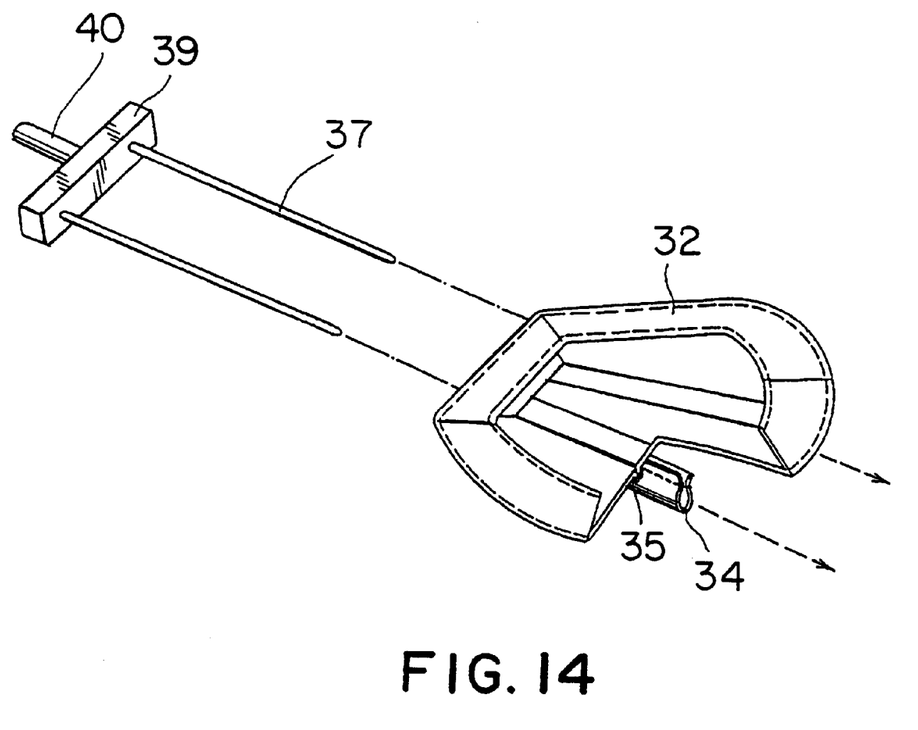
FIG. 14 shows a perspective view of the cover sheet, a hanging bag shown in FIG. 12 and pipes for supplying hot air before being inserted into the hanging bag.

FIG. 12 to FIG. 14 show the fifth embodiment of the present invention, and FIG. 12 is a transverse sectional view of a sheet of the present invention, showing that a cover sheet 32 is cut and stitched in accordance with the shape of a pad 31 made of urethane. In stitching the cover sheet 32, a hanging bag 34 is cylindrically stitched to the rear surface of the cover plate 32 in accordance with adhesive portion 33 equivalent to the groove shaped in the pad 31, as shown in FIG. 13 showing partially enlarged view of an essential part under sheet manufacturing step. The material of the hanging bag 34 is preferably selected from a non-woven fabric and a coarse meshed fabric.

On the front surface of the hanging bag 34, a hot melt adhesive layer is shaped. It is preferable to make the hot melt adhesive layer a film-like, mesh-like or point-like construction. Also, the numeral 35 shows stitched portion of the cover plate 32 to the hanging bag 34. Further, the numeral 37 is a metallic pipe of the jig inserted into the hole 34a of the hanging bags 34 while sheet manufacturing, and at least has a plural of radially shaped small holes 38 opposed against the hanging bag adhering portions 33.

The above-mentioned metallic or plastic pipes 37 are connected to a hot air source 40 through an air distributor 39, as shown in FIG. 14 together with neighboring pipe, and each end of the pipes is closed. Namely, the hot air supplied from the hot air source 40 is injected from the small holes 38 through the air distributor 39 and the metallic pipes 37. The hot air may be steam.

The metallic pipe 37 shown in FIG. 14 is inserted into the hanging bag 34 stitched to the above-mentioned cover plate 32, and then the hanging bag 34 is put into a groove of the hanging bag adhering portion 33 while guided by the metallic pipe 37. Then the hot air supplied from the air source is injected into the hanging bag 34 from small holes 38, while pushing the hanging bag 34 against the hanging bag adhering portion 33 of the pad 31. The hot air heats and melts the hot melt adhesive layer 36 through the meshed space of the hanging bag 34. Then, by switching the supply of the hot air to a supply of cold air for cooling, the hanging bag 34 is adhered to the pad 31.

After the adhering is finished, the metallic pipe 37 is extracted from the hanging bag 34, and then the seat production is completed.

In the above embodiment, when steam is used, polyamid type adhesive having a melting point of 100–150° C. may be preferably useful as the hot melt adhesive layer 36.

Further, when hot air is used, a preferable result was attained by using polyester type adhesive.

The thickness of hot melt adhesive layer 36 may be in the range of 0.05 to 1.0 mm.

Also, plastic pipes may be used instead of the metallic pipe 37, and preferable examples include FRP having a smooth surface enabling easy insertion or retraction and anti-high temperature property, and it is possible to use a meshed material having small holes by which it is easy to pass hot air from the holes to the periphery or the porous material having large voids.

When flexible pipes are used, it becomes possible to make a seat of a freely bent form and to increase design characteristics. In the above embodiment, cool air is fed also through the pipe 37, and it may be possible to blow off against the adhering portion from nozzles instead of through the pipe 37.

Connection of the hanging bag 34 to the cover sheet 32 is performed in this embodiment by stitching, but the present invention is not limited to only this stitching method.

Further in this embodiment, a heating method by supplying hot air in the pipe was shown as the heating method, but the present invention is not limited to only this embodiment, and all the practical heating methods are wholly applicable. For example, it may be possible to install an electric heater in the pipe. Further, as the wire-like material, it is possible to use not only the pipe, but wire or rods.

As described in detail, by applying the present invention, it becomes possible to prevent inferior adhesion owing to tearing off the hot melt adhesive layer, as the hanging bag covered with the hot melt adhesive layer is attached to the preferable position of the rear surface of the cover sheet of the seat, for example along the stitched line of the cover sheet, and the hanging bag is adhered to the seat pad together with the cover sheet.

As the hanging bag provided with the wire-like material is drawably set in the seat pad, and the hot melt adhesive layer is adhered by heating and melting the adhesive, then the hanging bag linearly arranged is securely drawn into the hanging bag adhering portion of the seat pad, and it becomes possible to shape the deep drawn shape in the corner of the seat by shaping the hanging bag adhering portion of the seat pad in the deeply grooved shape and by strongly drawing the cover sheet.

In adhering, instead of the hanging bag being pushed from the cover sheet, the bag is drawn by the wire-like material, and it becomes possible to expand the freedom of cover sheet selection owing to characteristics not crushed even if using the napped cover plate.

Also, as the wire-like member used in the adhering process, the completed seat retains no material that interferes with recycling, such as metal, and is comfortable when seated on.

What we claim is:

1. A method of manufacturing a seat having a seat pad of predetermined configuration, comprising the steps of:

installing a separate hanging bag, provided with a hot-melt adhesive on an external surface thereof, on a suitable portion of a rear surface of an outer skin of said seat;

inserting an elongated element in said hanging bag, and drawing and setting said hanging bag into an adhering portion of a groove shaped in said seat pad, and removing said elongated element after said hot-melt adhesive is heated and melted and adhered to said seat pad.

2. The method according to claim 1, wherein said hot-melt adhesive is a layer of about 0.05 to about 1.0 mm thickness.

3. The method according to claim 1, wherein said elongated element is a rod.

4. The method according to claim 1, wherein said elongated element is a wire-like material.

5. The method of manufacturing a seat having a seat pad of predetermined configuration, according to claim 1, wherein said elongated element is a pipe, having a plurality of holes about a peripheral surface thereof, and injecting a hot gas into said pipe for passing through said plurality of holes, so as to heat and melt said hot-melt adhesive on said external surface of said hanging bag, and removing said pipe after said hot-melt adhesive is heated and melted, and adhered to said seat pad upon curing by cold air.

6. The method according to claim 5, wherein said hot gas is steam, and said hot-melt adhesive is a polyamide having a melting point of 100–150° C.

7. The method according to claim 5, wherein said hot gas is hot air, and said hot-melt adhesive is a polyester.

8. The method according to claim 5, wherein said pipe is flexible and conforms at least in part to the predetermined configuration of seat pad.

9. The method according to claim 5, wherein said hanging bag is fabricated from a material selected from a group consisting of non-woven fabrics and coarse meshed fabrics.

10. A method of manufacturing a seat having a seat pad of predetermined configuration, comprising the steps of:

installing a separate hanging bag, provided with a hot-melt adhesive on an external surface thereof, on a portion of a rear surface of an outer skin of said seat, inserting a pipe provided with an electric heater in said hanging bag, drawing and setting said hanging bag into an adhering portion of a groove shaped in said seat pad, adhering said hanging bag to said seat pad after said hot-melt adhesive is cured by cold air upon first being heated and melted by heating said pipe by applying current to said electric heater, and thereafter removing said pipe from said hanging bag.

* * * * *